United States Patent [19]
Enari

[11] Patent Number: 6,151,412
[45] Date of Patent: *Nov. 21, 2000

[54] IMAGE PROCESSING APPARATUS HAVING CAPABILITY OF SYNTHESIZING CONTENTS OF PLURAL MEMORIES

[75] Inventor: Masahiko Enari, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/262,359

[22] Filed: Jun. 20, 1994

Related U.S. Application Data

[63] Continuation of application No. 07/757,319, Sep. 10, 1991, abandoned.

[30] Foreign Application Priority Data

Sep. 12, 1990 [JP] Japan ................................. 2-242015

[51] Int. Cl.⁷ ...................................................... G06K 9/36
[52] U.S. Cl. .............................................................. 382/232
[58] Field of Search ................................... 382/232, 276, 382/302, 304, 305, 307; 358/426, 444

[56] References Cited

U.S. PATENT DOCUMENTS

| | | | |
|---|---|---|---|
| 4,652,935 | 3/1987 | Endoh et al. | 382/56 |
| 4,692,944 | 9/1987 | Masuzaki et al. | 382/304 |
| 4,750,212 | 6/1988 | Yokomizo | 382/56 |
| 4,860,375 | 8/1989 | McCubbrey et al. | 382/49 |
| 4,949,282 | 8/1990 | Muraoka | 382/41 |
| 4,982,283 | 1/1991 | Acampora | 382/49 |
| 5,117,468 | 5/1992 | Hino et al. | 382/304 |

*Primary Examiner*—Jose L. Couso
*Attorney, Agent, or Firm*—Fitzpatrick, Cella, Harper & Scinto

[57] ABSTRACT

An image processing apparatus has plural memories each capable of storing image data of a picture frame, and combines the image data of the plural memories. A data bus transmits the output resulting from the combining, to the input of the plural memories.

14 Claims, 7 Drawing Sheets

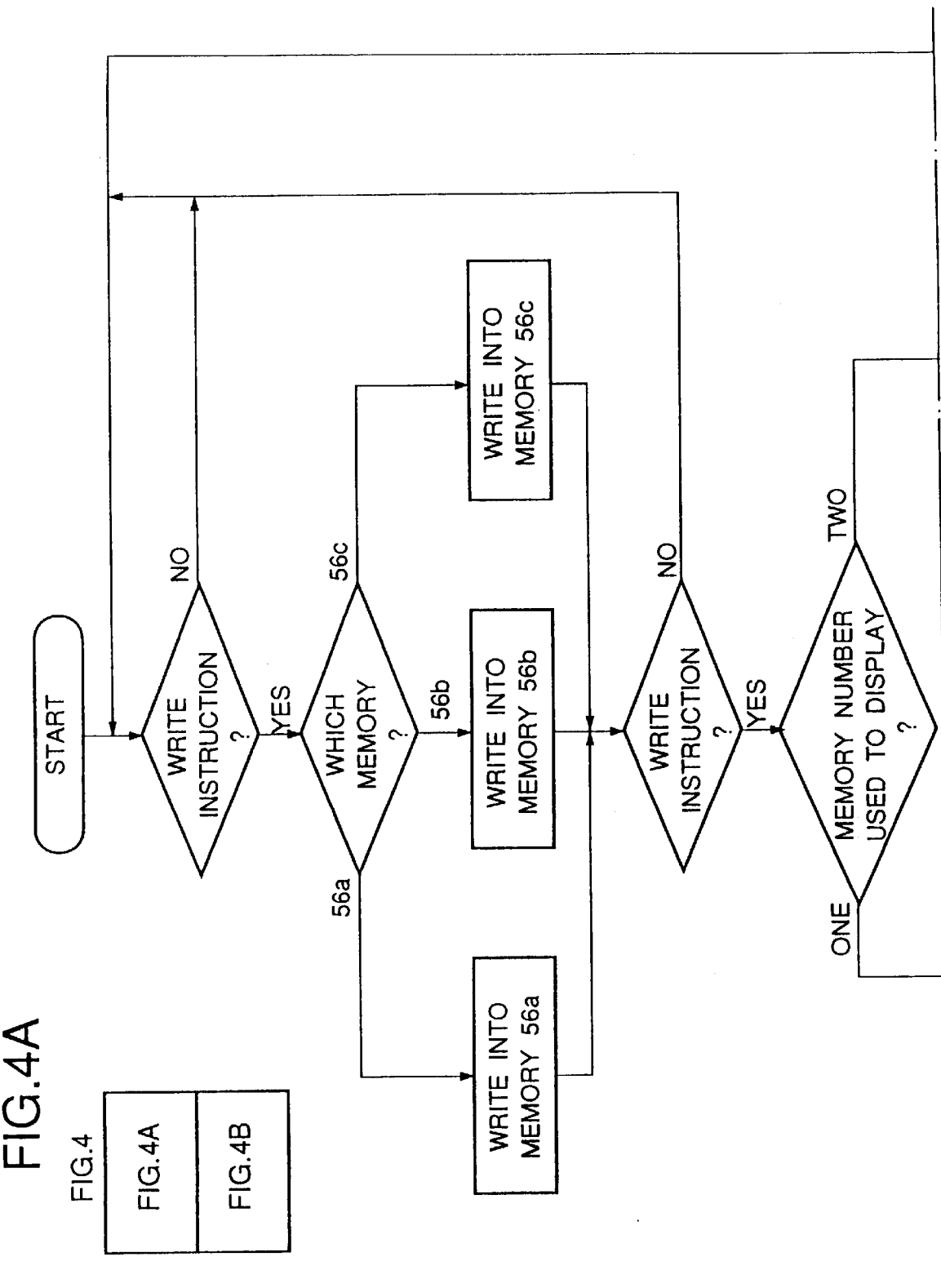

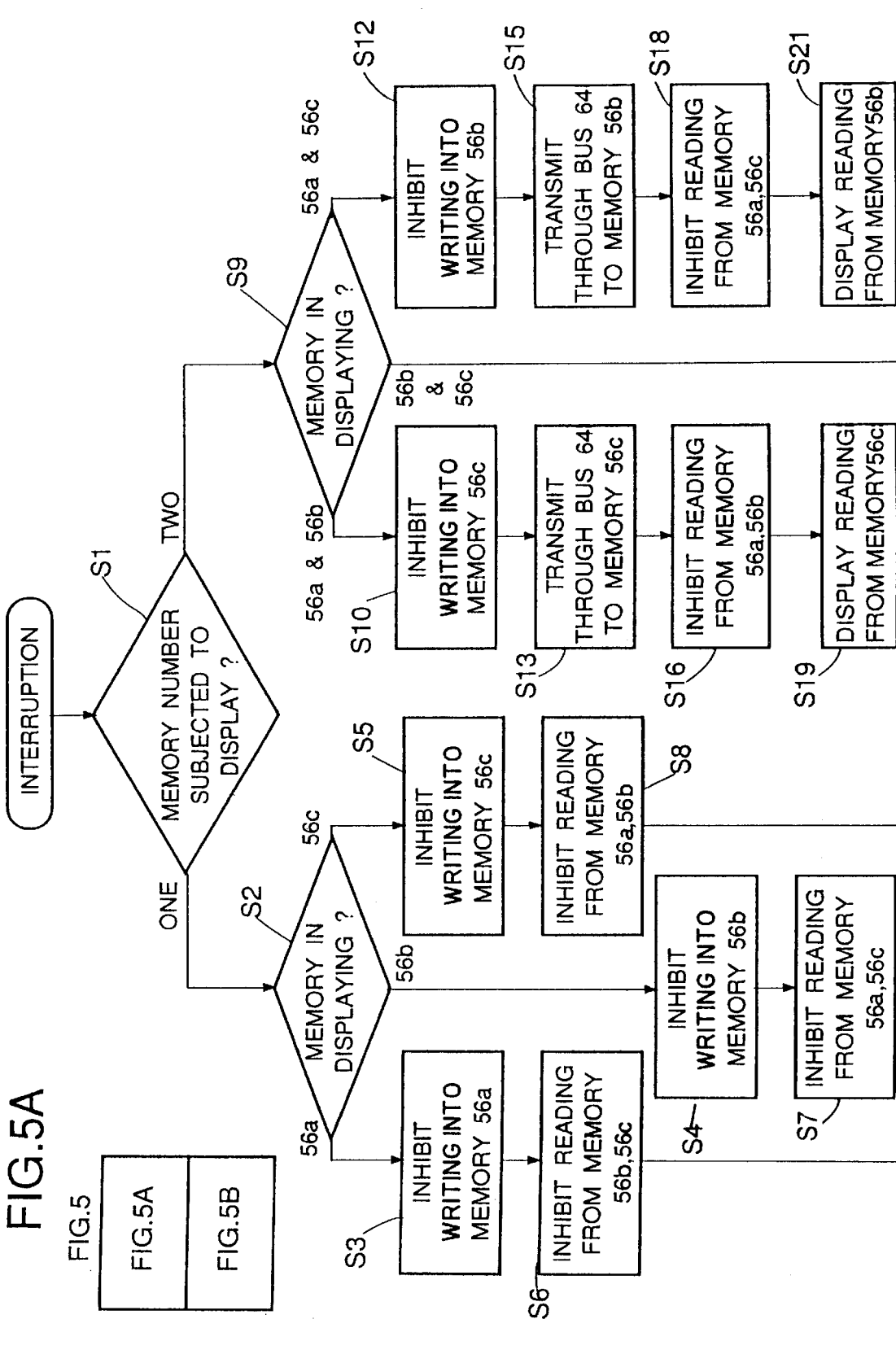

IMAGE PROCESSING APPARATUS HAVING CAPABILITY OF SYNTHESIZING CONTENTS OF PLURAL MEMORIES

This application is a continuation of application Ser. No. 07/757,319 filed Sep. 10, 1991, now abandoned.

BACKGROUND OF THE INVENTION

1. Field of the Invention

The present invention relates to an image processing apparatus, and more particularly to an image processing apparatus for decoding compressed image information obtained from a transmission channel or a recording medium.

2. Related Background Art

In a still image transmission system, an image is compression encoded on the transmitter side, then transmitted through a transmission channel such as a satellite channel, a public channel, a recording/reproducing circuit of an image record/reproducing system or a digital record/reproducing system, to a receiver side, and is decoded there to reproduce the original image.

The transmitter side selects necessary parts from image data entered, for example, from an image scanner or a video camera, effects image processing such as image enlargement or reduction or deformation, further effects data compression by sub-sampling and DPCM, and sends the obtained compressed data in a predetermined format to the transmission channel. The receiver side usually has plural frame memories, and reproduces the original image by expanding the signals received from the transmission channel, utilizing said frame memories cyclically. Then the data in a frame memory, storing the restored image, are read for display. Thus, while decoding (expansion) is conducted on the contents of one frame memory, the restored image data are read from another frame memory for display. The display of the received image on monitor has to wait during the decoding if only one frame memory is available, but the alternate or cyclic use of plural frame memories allows one to reduce the waiting time for image display.

In a case where there are provided plural, for example two, frame memories as explained above, it is possible to synthesize a part of the image stored in the first frame memory with a part of the image stored in the second frame memory, by replacing a part of the image data read from said first frame memory with the image data read from the second frame memory. However, such synthesized image data themselves are not stored in the first frame memory, nor in the second one, so that it has not been possible to apply image processing to such synthesized image.

SUMMARY OF THE INVENTION

An object of the present invention is to provide an image processing apparatus not associated with the above-mentioned limitations.

Another object of the present invention is to provide an image processing apparatus easily capable of various processings.

Still another object of the present invention is to provide an image processing apparatus capable of high-speed image processing.

The foregoing objects can be attained, according to a preferred embodiment of the present invention, by an image processing apparatus comprising:

plural memories each capable of storing image data of a picture frame;

process means capable of combining image data from said plural memories; and a data bus for transmitting the output of said process means to the input of said plural memories.

Still another object of the present invention is to provide an image processing apparatus capable of various novel processings.

Still other objects of the present invention, and the advantages thereof, will become fully apparent from the following description, to be taken in conjunction with the attached drawings.

DETAILED DESCRIPTION OF THE PREFERRED EMBODIMENTS

Now the present invention will be clarified in detail by embodiments thereof shown in the attached drawings.

Figure 1:
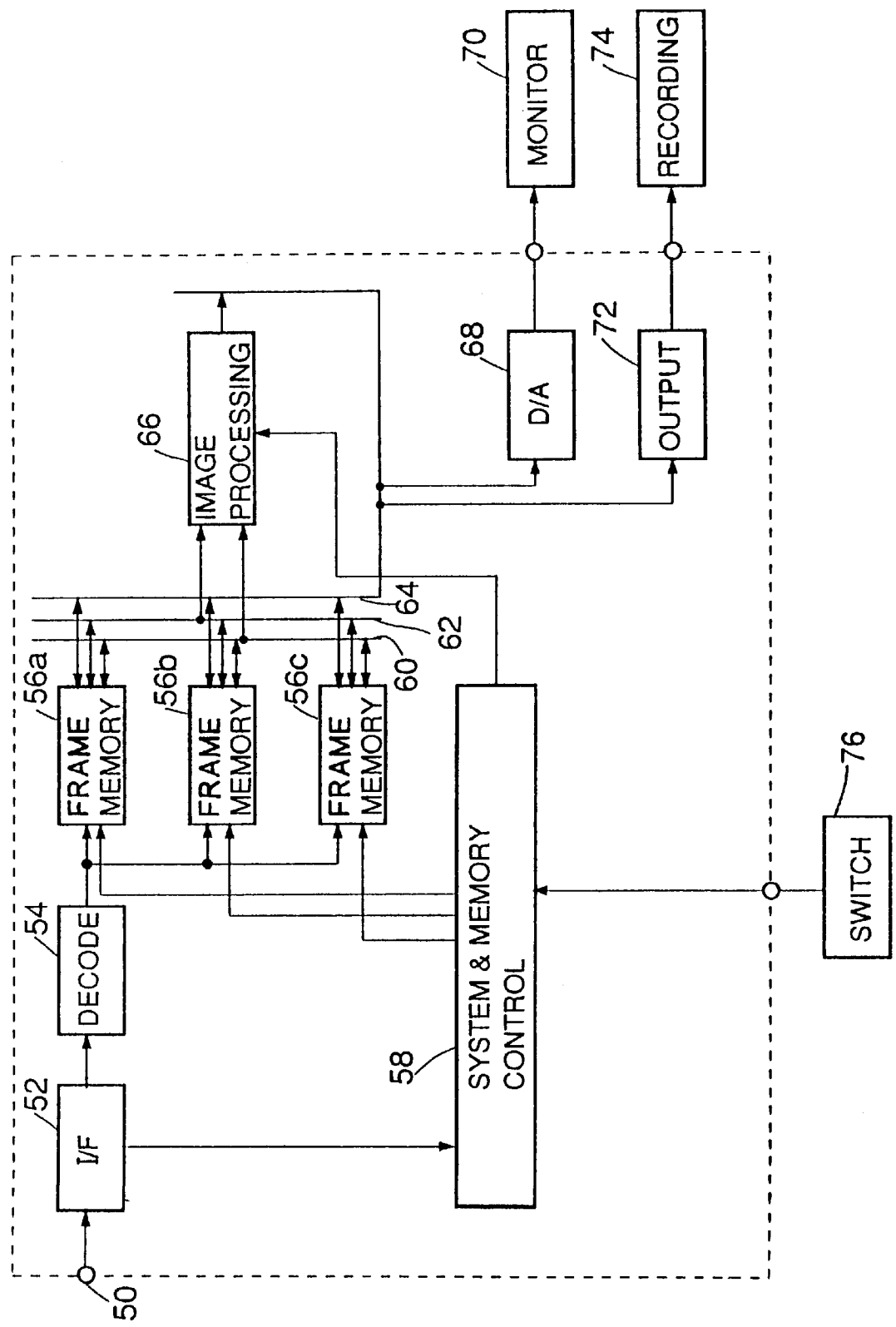
FIG. 1 is a block diagram of an embodiment of the present invention.

FIG. 1 is a block diagram of an embodiment of the present invention applied to a still image transmission system, wherein are shown an input terminal 50 for compressed image data, for example from a transmission channel; an interface 52 for separating the signals from the input terminal 50 into compressed image data and commands, and sending said compressed image data to a decoding circuit 54 and said commands to a system and memory control circuit 58 to be explained later; frame memories 56a, 56b, 56c having a memory capacity of a frame each and composed of multi-port random access memories capable of storing the output data of the decoding circuit 54 at random addresses and allowing readout of the stored data with an effective frame rate (namely 1/30 seconds for a frame) a synchronously with the data recording; and a system and memory control circuit 58 for controlling the data recording and readout of the memories 56a, 56b, 56c and also controlling the entire image processing circuit.

Digital video buses 60, 62, 64 capable of data transmission with the frame rate can effect input/output of image data among the frame memories 56a, 56b, 56c. An image processing circuit 66 is capable, in response to an instruction from the control circuit 58 according to the aforementioned command, of fetching image data from the buses 60, 62 and releasing the processed image data to the bus 64. There are further provided a D/A converter 68 for converting the image data on the bus 64 into an analog signal; a monitor 70 for displaying the output image signal of the D/A converter 68; an output circuit 72 for sending the data on the bus 64 to a recording apparatus 74 such as a VCR or a printer; and a switch 76 for sending instruction for a predetermined operation to the system and memory control circuit 58.

The interface 52 normally sends, among the data entered from the input terminal 50, the compressed image data to the decoding circuit 54 and the commands, etc., to the control circuit 58. The decoding circuit 54 decodes the compressed image data to the original image data, and the obtained output is recorded in one of the frame memories 56a, 56b, 56c, designated by the control circuit 58 according to the aforementioned command. The control circuit 58 also selects the bus 60 or 62 for use by the frame memories 56a, 56b, 56c under suitable time control, thereby transferring the data from the frame memory 56a, 56b or 56c through the bus 60 or 62 to the image processing circuit 66. The image data processed in said processing circuit 66 are supplied, through the bus 64, to the D/A converter 68 and the output circuit 72, and are displayed on the monitor 70 and recorded in the recording apparatus 74, for example on paper or magnetic tape.

Figure 2:
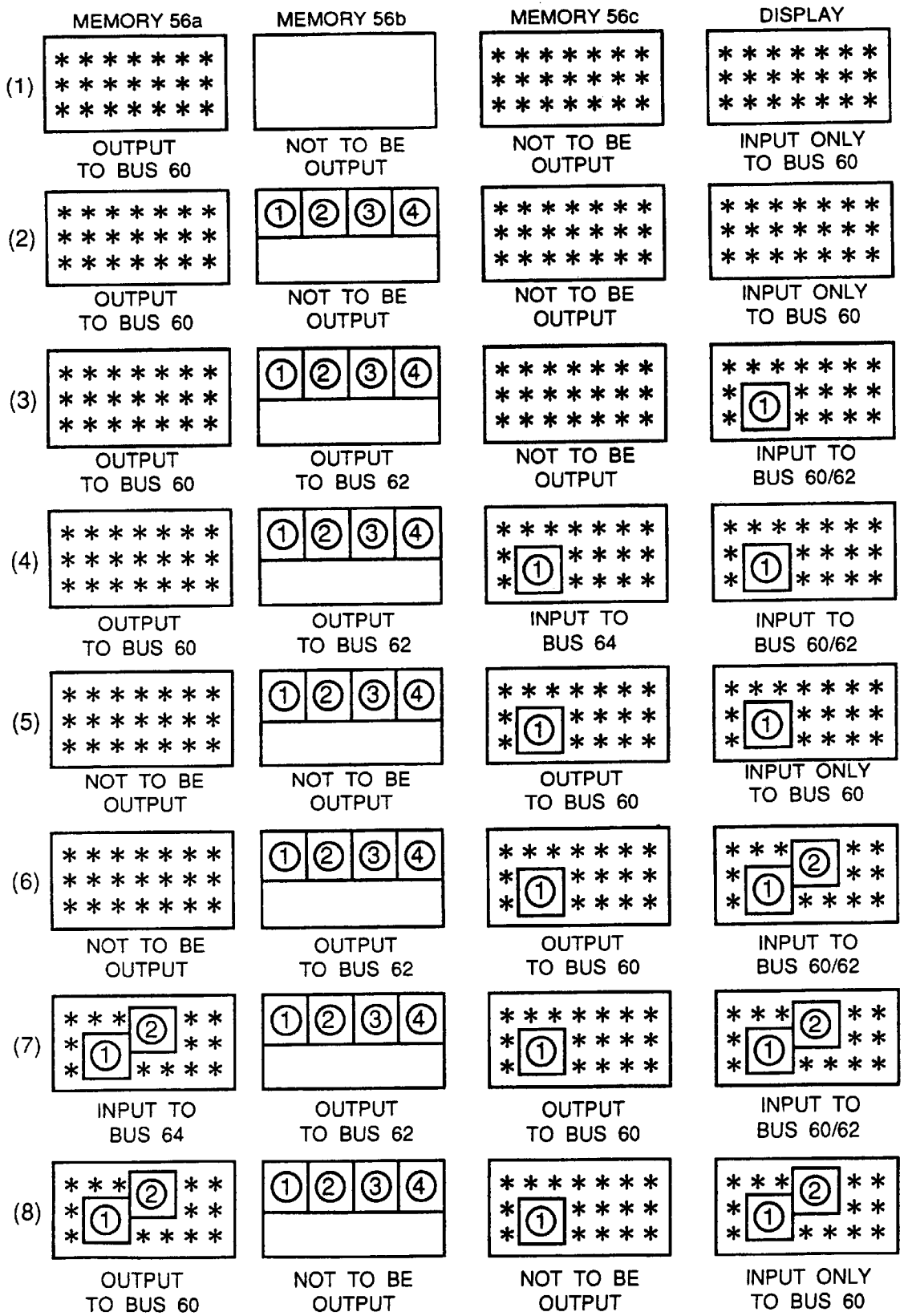
FIGS. 2 and 3 are views showing images stored in memories 56a, 56b, 56c and displays in various stages of the present invention.

In the following there will be explained functions featuring the present embodiment, with reference to FIGS. 2 to 5. FIG. 2 schematically illustrates changes in the contents of the frame memories 56a, 56b, 56c and in the image displayed on the monitor 70.

Referring to FIG. 2, at first a basic image is stored in the entire area of the frame memory 56a. Then the stored data are read through the bus 60, and the image processing circuit 66 merely transmits the image data from said bus 60 to the bus 64. The image data on the bus 64 are converted into an analog signal by the D/A converter 68 and are displayed on the monitor 70 (state (1) in FIG. 2). During the display of the image stored in the frame memory 56a, partial images #1, #2, #3, . . . (represented by ①, ②, ③, . . . in FIG. 2) are stored in certain areas of the frame memory 56b (state (2) in FIG. 2). After storage, the data stored in the frame memory 56b are read to the bus 62. The image processing circuit 66 suitably switches between buses 60, 62 in time, whereby the monitor 70 displays an image which consists of the basic image in the frame memory 56a and is partially replaced by the partial image #1 in the frame memory 56b (state (3) in FIG. 2).

Simultaneously with said display, the output data of the image processing circuit 66, namely the data of the displayed image, are stored, through the bus 64, in the frame memory 56c with the frame rate. As a result, the frame memory 56c stores data of an image consisting of the basic image of the frame memory 56a overlapped with the partial image #1 of the frame memory 56b (state (4) in FIG. 2). After said image storage, the control circuit 58 disconnects the bus 60 from the frame memory 56a and connects said bus 60 to the frame memory 56c thereby reading the data therein to the bus 60, and causes the image processing circuit 66 to merely transmit the image data of the bus 60, whereby a state (5) in FIG. 2 is attained.

Then the partial image #2 is read from the frame memory 56b to the bus 62, and the image processing circuit 66 switches between buses 60, 62 in time, thereby releasing data to the bus 64 (state (6) in FIG. 2). Then the image data on the bus 64 are transferred at the frame rate and stored into the frame memory 56a. Thus the monitor 70 displays an image, consisting of the image stored in the frame memory 56c partially replaced by the partial image #2 of the frame memory 56b, and the corresponding image data are stored in the frame memory 56a (state (7) in FIG. 2). After storage into the frame memory 56a, the control circuit 58 detaches the frame memory 56c from the bus 60, sends the image data read from the frame memory 56a to the bus 60, and controls the image processing circuit 66 to transmit the image data from the bus 60 to 64 (state (8) in FIG. 2).

In this manner the frame memory 56a or 56c stores data of an image consisting of the basic image stored in the frame memory 56a, overlapped with the partial images #1, #2, #3, . . . of the frame memory 56b. These processes are conducted by the control circuit 58, according to the commands separated by the interface 53. In FIG. 2, the process from (3) to (4) and from (6) to (7) need not be conducted within a frame time.

Figure 3:
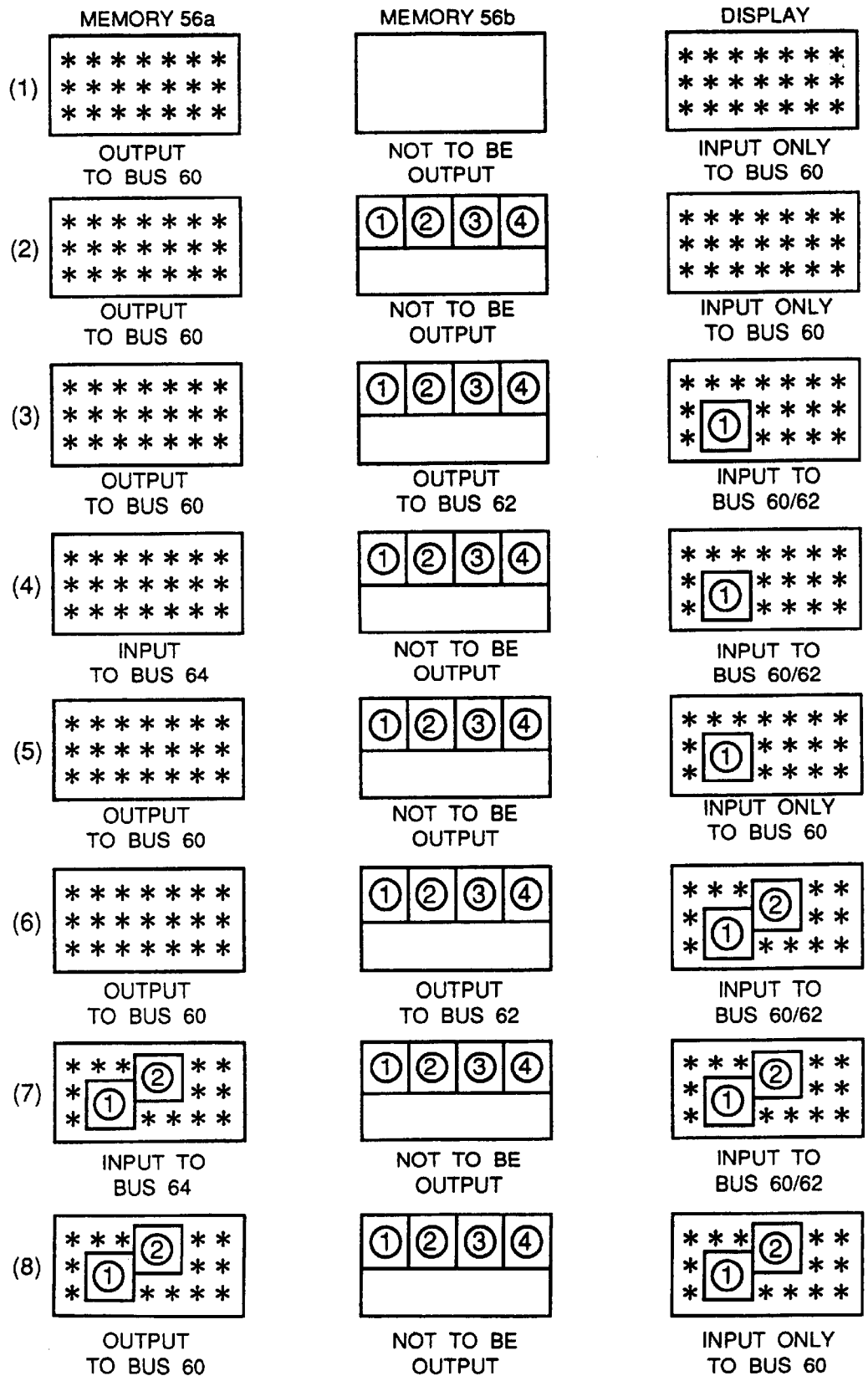

The functions shown in FIG. 2 can be achieved with only two frame memories 56a and 56b. FIG. 3 is a view showing states, without the frame memory 56c , corresponding to those shown in FIG. 2.

At first a basic image is stored in the entire area of the frame memory 56a. Then the stored data are read through the bus 60, then transmitted by the image processing circuit 66 to the bus 64, and displayed on the monitor 70 (state (1) in FIG. 3). During the display of the image stored in the frame memory 56a, partial images #1, #2, #3, . . . are stored in certain areas of the frame memory 56b (state (2) in FIG. 3). After said storage, the data stored in the frame memory 56b are read through the bus 62. The image processing circuit 66 selectively switches the buses 60, 62 in time, whereby the monitor 70 displays an image consisting of the basic image stored in the frame memory 56a, partially replaced by the partial image #1 stored in the frame memory 56b (state (3) in FIG. 3).

Simultaneous with said display, the output data of the image processing circuit 66, namely the data of the displayed image, are transferred through the bus 64 at the frame rate and stored in the frame memory 56a. Thus there are stored, in the frame memory 56a, data of an image formed by partially replacing the original basic image of the frame memory 56a with the partial image #1 of the frame memory 56b (state (4) in FIG. 3). After the data storage into the frame memory 56a, the system and memory control circuit 58 reads the data from the frame memory 56a through the bus 60, and causes the image processing circuit 66 to transmit said image data on the bus 60, whereby attained is a state (5) in FIG. 3.

Then the partial image #2 is read from the frame memory 56b to the bus 62, and the image processing circuit 66 selectively switches the buses 60, 62 in time to send the output data to the bus 64, whereby the monitor 70 displays the basic image overlapped with the partial images #1 and #2 (state (6) in FIG. 3). Simultaneous with this display, the output data of the image processing circuit 66 are transferred through the bus 64 at the frame rate and stored in the frame memory 56a. Thus there are stored, in the frame memory 56a, data of an image consisting of the basic image overlapped with the partial images #1, #2 of the frame memory 56b (state (7) in FIG. 3). After the data storage into the frame memory 56a, the control circuit 58 reads the data of the frame memory 56a through the bus 60, and so controls the image processing circuit 66 as to transmit the image data from the bus 60 to 64 (state (8) in FIG. 3).

Figure 4B:
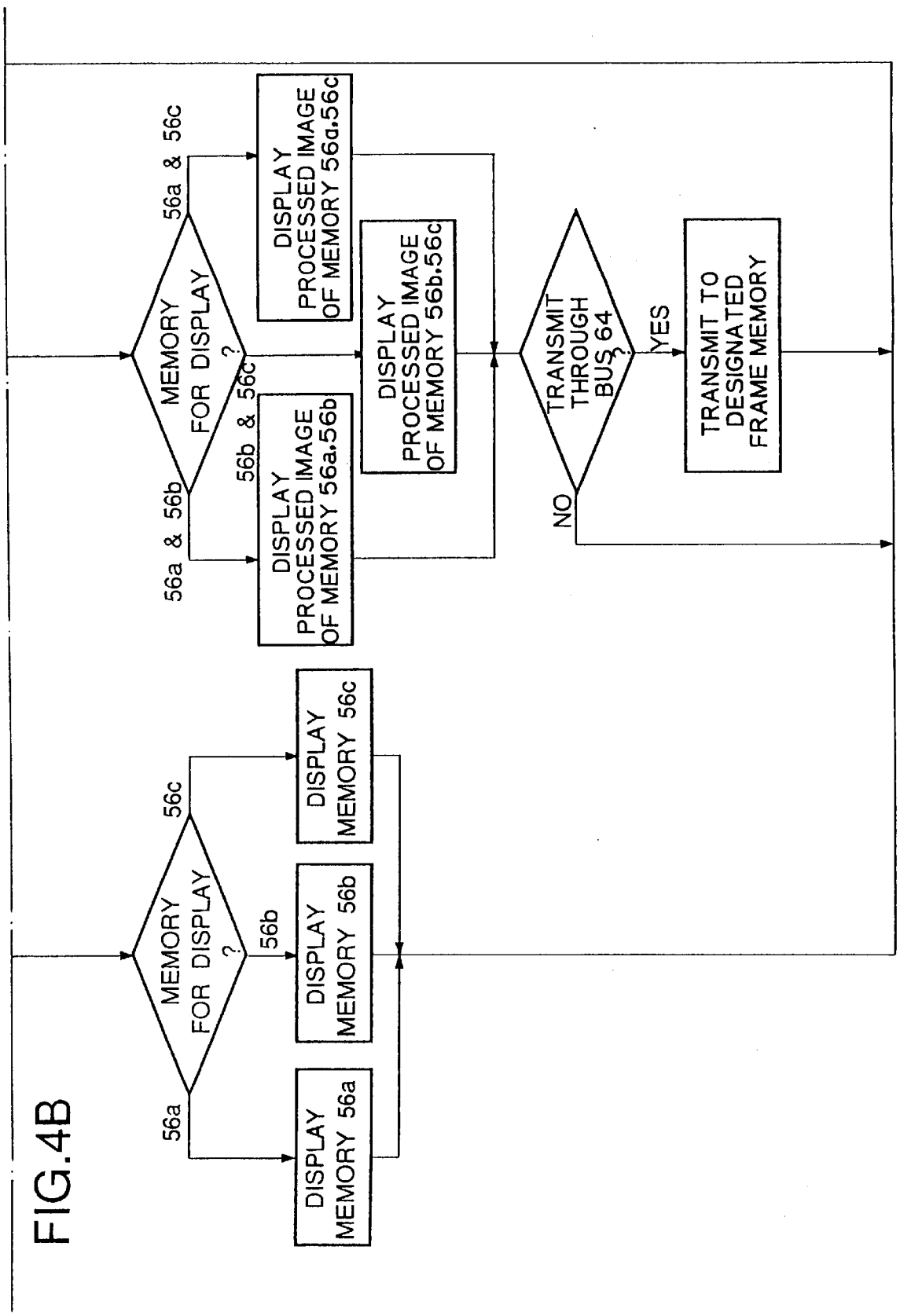
FIG. 4, consisting of FIGS. 4A and 4B, is a flow chart showing a control sequence for selecting the memories 56a, 56b and 56c.
Figure 5B:
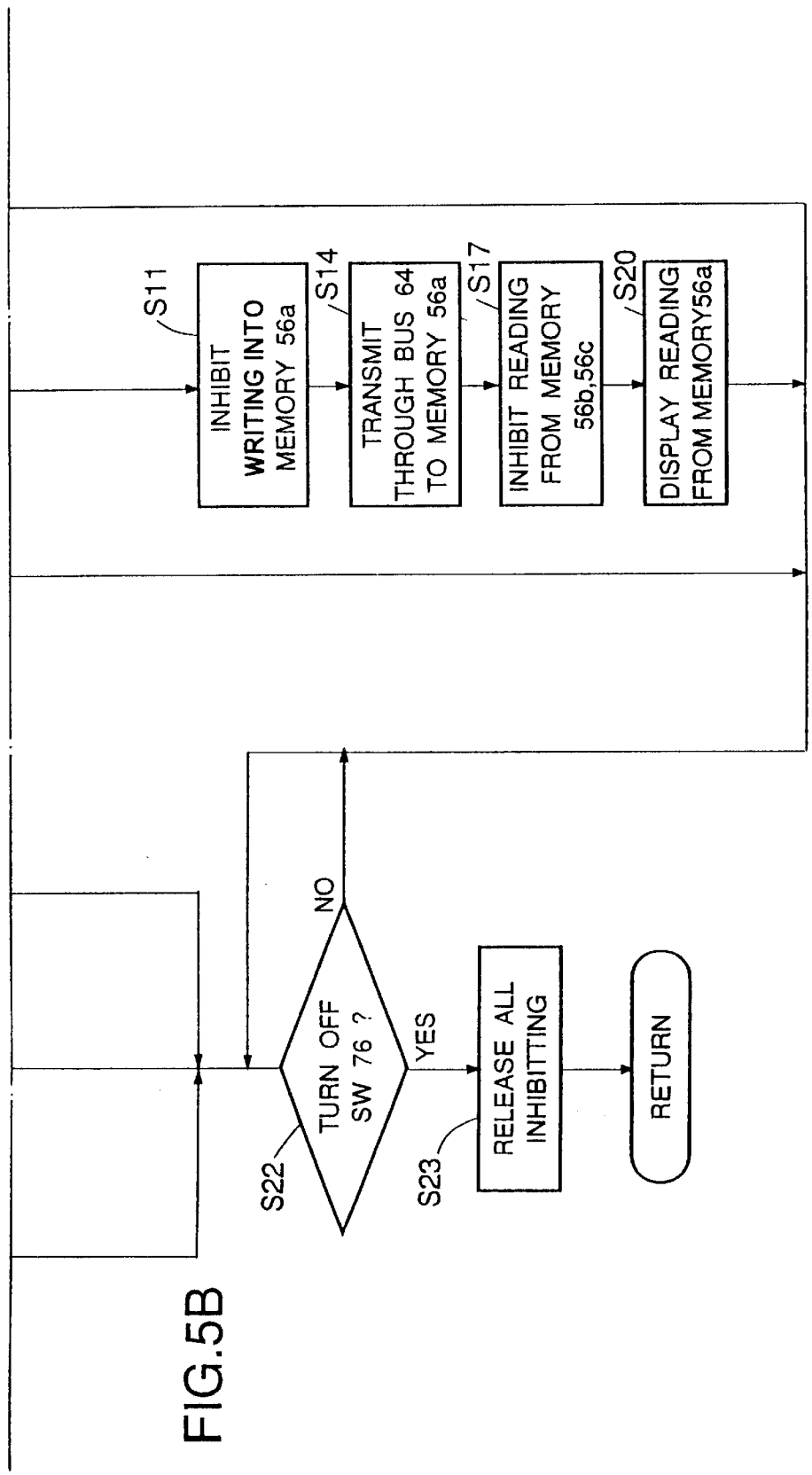
FIG. 5, consisting of FIGS. 5A and 5B, is a flow chart showing an interruption sequence for recording.

FIG. 4 is a flow chart showing the sequence of selection of the frame memories 56a, 56b and 56c, in the normal operations and in the operations explained above in relation to FIGS. 2 and 3.

In the following there will be explained the functions in case of recording the displayed image with the external recording apparatus 74. The operator turns on the switch 76 in case the image currently displayed on the monitor 70 is to be recorded by the recording apparatus 74. Detecting the actuation of the switch 76, the control circuit 58 executes an interruption sequence shown in FIG. 5. The control circuit 58 discriminates whether the image displayed at the closing of the switch 76 is obtained from one a frame memory or two frame memories (S1). If said displayed image is obtained from one frame memory, the control circuit inhibits data writing into the frame memory used for display (S2, S3, S4 and S5), also inhibits data readout from other frame memories to the buses 60, 62 (S6, S7 and S8), and maintains this state until the switch 76 is turned off. On the other hand, if the step S1 identifies that the image displayed at the closing of the switch 76 utilizes plural frame memories for example for scroll, wiping or partial display, data writing from the decoding circuit 54 into the frame memory not used in display is inhibited (S9, S10, S11 and S12), and the image data in display (output data of the image processing circuit 66) are transferred through the bus 64 and stored in the frame memory not used in the display (S13, S14 and S15). Then the data reading from the frame memory in display to the buses 60, 62 is inhibited (Sl6, S17 and S18). Then the image data stored in the frame memory which has not been used for display are read through the bus 60 or 62, transmitted by the image processing circuit 66 and displayed on the monitor 70. This state is continued until the switch 76 is turned off. After the steps S16, S17 and S18, the writing of data from the decoding circuit 54 is enabled into frame memories other than the one storing the data used for display on the monitor 70.

When the switch 76 is turned off, all the inhibitions in the interruption sequence are cancelled, and the sequence returns to the main routine from the interruption process.

This interruption sequence stores the data of the displayed image in a frame memory. Thus said image can be observed as a still image on the monitor 70 by continuous data reading from said frame memory, and can also be recorded by the recording apparatus 74, for example a printer. During such operation, other frame memories can accept the data from the decoding circuit 54, so that there is little disturbance in the display when the received image is again displayed on the monitor.

The present invention is not limited by the number of the frame memories and the buses in the above-explained embodiment. In the structure shown in FIG. 1, the recording apparatus is provided with a digital interface, but a recording apparatus equipped with an analog interface may be connected to the output of the D/A converter 68. Also, the above-explained embodiment deals with the still image, but it can also handle a moving image in which each image is refreshed every 1/30 second, by high-speed circuits in various units.

Said embodiment enables application of a new image processing to an already processed image, by connecting at least two frame memories composed of multi-port random access memories and the output of the image processing circuit 66 by means of at least one digital data bus. It also enables continuous output of a processed image, required for recording or continuous display.

As will be easily understood from the foregoing description, the present embodiment enables storage, in memory means, the image data obtained by applying predetermined processes in cumulative manner to a decoded image, thereby enabling the continuous display or recording of thus obtained image.

What is claimed is:

1. An image processing apparatus comprising:
plural memories each having a capacity for storing image data of a picture frame;
process means for combining images corresponding to the image data stored in said plural memories to obtain combined image data;
a first bi-directional data bus connected to each of said plural memories and to an input of said process means;
a second bi-directional data bus connected to an output of said process means and each of said plural memories;
output means, connected to said second bi-directional data bus, for outputting image data to display means for displaying an image; and
control means for changing a first connection operation between said plural memories and the input of said process means for selectively transferring image data from each of said plural memories to the input said process means via said first bi-directional data bus, and for changing a second connection operation between the output of said process means and said plural memories to store the output of said process means in a selected one of said plural memories via said second bi-directional data bus, and for changing a third connection operation between said plural memories for selectively transferring image data between said plural memories via said first bi-directional data bus.

2. An image processing apparatus comprising:
plural memories each having a capacity for storing image data of a picture frame;
process means for combining images corresponding to the image data stored in said plural memories to obtain combined image data;
a first bi-directional data bus connected to each of said plural memories and to an input of said process means;
a second bi-directional data bus connected to an output of said process means and each of said plural memories;
output means, connected to said second bi-directional data bus, for outputting image data to recording means for recording an image; and
control means for changing a first connection operation between said plural memories and the input of said process means for selectively transferring image data from each of said plural memories to the input said process means via said second bi-directional data bus, and for changing a second connection operation between the output of said process means and said plural memories to store the output of said process means in a selected one of said plural memories via said second bi-directional data bus, and for changing a third connection operation between said plural memories for selectively transferring image data between said plural memories via said first bi-directional data bus.

3. An image processing apparatus comprising:
plural memories each having a capacity for storing image data of a picture frame;
process means for combining images corresponding to the image data stored in said plural memories to obtain combined image data;
a first bi-directional data bus connected to an input of said process means and each of said plural memories;
a second bi-directional data bus connected to an output of said process means and each of said plural memories; and
control means for changing a first connection operation between said plural memories and the input of said process means for selectively transferring image data from each of said plural memories to the input of said process means via said first bi-directional data bus, and for changing a second connection operation between the output of said process means and said plural memories to store the output of said process means in a selected one of said plural memories via said second bi-directional data bus, and for changing a third connection operation between said plural memories for selectively transferring image data between said plural memories via said first bi-directional data bus.

4. An apparatus according to claim 3, further comprising output means, connected to said data bus, for outputting image data from one of said plural memories and said process means to display means for displaying image.

5. An apparatus according to claim 3, further comprising output means, connected to said data bus, for outputting image data from one of said plural memories and said process means to recording means for recording an image.

6. An apparatus according to claim 3, further comprising another bi-directional data bus connected to an input of said process means and each of said plural memories.

7. An apparatus according to claim 3, further comprising input means for inputting image data to one of said plural memories.

8. An apparatus according to claim 3, wherein said process means is adapted to effect paste-up synthesis of the images of plural memories.

9. An apparatus according to claim 3, further comprising instruction means for generating an instruction for storing the output of said process means in one of said plural memories.

10. An apparatus according to claim 9, wherein said instruction means is adapted to generate the instruction in response to a manual operation.

11. An apparatus according to claim 3, wherein said image data is a compressed image signal.

12. An image processing apparatus comprising:

plural memories each having a capacity for storing image data of a picture frame;

process means for combining images corresponding to the image data stored in said plural memories to obtain combined image data;

a first bi-directional data bus connected to each of said plural memories and to an input of said process means;

a second bi-directional data bus connected to each of said plural memories and to the input of said process means;

a third bi-directional data bus connected to each of said plural memories and to an output of said process means;

output means connected to said third bi-directional data bus for outputting image data to display means for displaying an image; and control means for changing a first connection operation between said plural memories and the input of said process means for selectively transferring image data from each of said plural memories to the input of said process means via one of said first and second bi-directional data buses, and for changing a second connection operation between the output of said process means and said plural memories to store the output of said process means in a selected one of said plural memories via said third bi-directional data bus, and for changing a third connection operation between said plural memories for selectively transferring image data between said plural memories via one of said first and second bi-directional data buses.

13. An image processing apparatus comprising:

plural memories each having a capacity for storing image data of a picture frame;

process means for combining images corresponding to the image data stored in said plural memories to obtain combined image data;

a first bi-directional data bus connected to each of said plural memories and to an input of said process means;

a second bi-directional data bus connected to each of said plural memories and to the input of said process means;

a third bi-directional data bus connected to each of said plural memories and to an output of said process means;

output means connected to said third bi-directional data bus for outputting image data to recording means for recording an image; and control means for changing a first connection operation between said plural memories and the input of said process means for selectively transferring image data from each of said plural memories to the input said process means via one of said first and second bi-directional data buses, and for changing a second connection operation between the output of said process means and said plural memories to store the output of said process means in a selected one of said plural memories via said third bi-directional data bus, and for changing a third connection operation between said plural memories for selectively transferring image data between said plural memories via one of said first and second bi-directional data buses.

14. An image processing apparatus comprising:

plural memories each having a capacity for storing image data of a picture frame;

process means for combining images corresponding to the image data stored in said plural memories to obtain combined image data;

a first bi-directional data bus connected to each of said plural memories and to an input of said process means;

a second bi-directional data bus connected to each of said plural memories and to the input of said process means;

a third bi-directional data bus connected to each of said plural memories and to an output of said process means; and control means for changing a first connection operation between said plural memories and the input of said process means for selectively transferring image data from each of said plural memories to said process means via one of said first and second bi-directional data buses, and for changing a second connection operation between the output of said process means and said plural memories to store the output of said process means in a selected one of said plural memories via said third bi-directional data bus, and for changing a third connection operation between said plural memories for selectively transferring image data between said plural memories via one of said first and second bi-directional data buses.

* * * * *

UNITED STATES PATENT AND TRADEMARK OFFICE
CERTIFICATE OF CORRECTION

PATENT NO. : 6,151,412
DATED : November 21, 2000
INVENTOR(S) : Masahiko Enari

It is certified that error appears in the above-identified patent and that said Letters Patent is hereby corrected as shown below:

Column 4,
Line 7, "56c ," should read -- 56c, --;
Line 65, "one a" should read -- one --;

Column 5,
Line 13, "the" should be deleted.

Column 6,
Line 9, "input said" should read -- input of said --;
Line 36, "input said" should read -- input of said --.

Column 8,
Line 21, "input said" should read -- input of said --.

Signed and Sealed this

Sixteenth Day of October, 2001

Attest:

NICHOLAS P. GODICI
Attesting Officer
Acting Director of the United States Patent and Trademark Office